Sept. 27, 1966    P. V. MONNIN    3,275,312
SHOCK ABSORBER AND AUXILIARY SPRING UNIT
Filed June 4, 1964    2 Sheets-Sheet 1

PHILIP V. MONNIN
INVENTOR
John R. Faulkner
BY Clifford L. Sadler
ATTORNEYS

Sept. 27, 1966  P. V. MONNIN  3,275,312
SHOCK ABSORBER AND AUXILIARY SPRING UNIT
Filed June 4, 1964  2 Sheets-Sheet 2
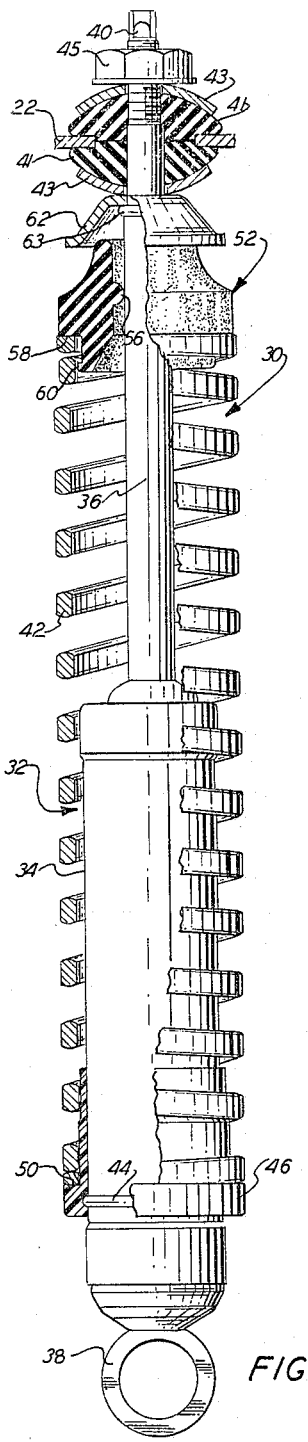
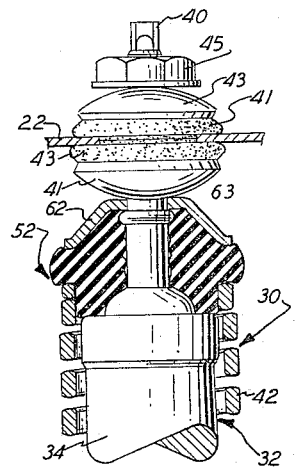
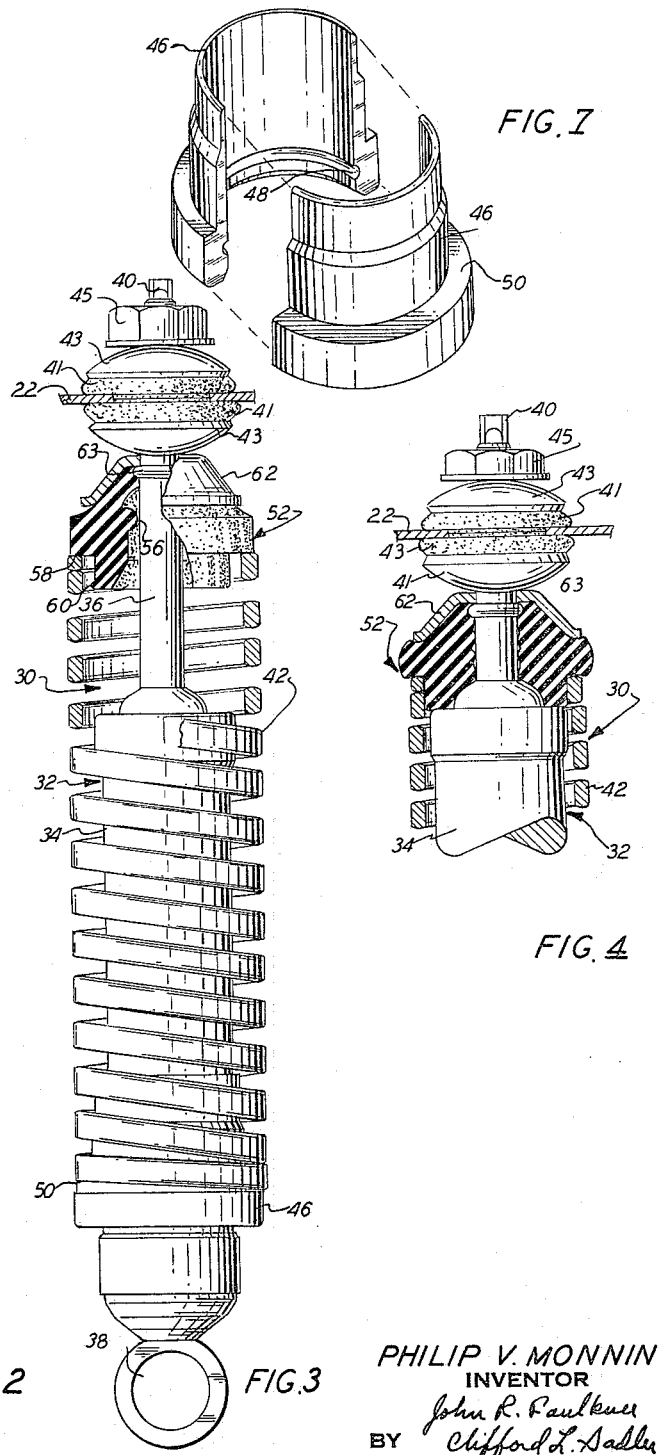
PHILIP V. MONNIN
INVENTOR
BY John R. Faulkner
Clifford L. Sadler
ATTORNEYS

United States Patent Office 3,275,312
Patented Sept. 27, 1966

3,275,312
SHOCK ABSORBER AND AUXILIARY SPRING UNIT
Philip V. Monnin, Novi, Mich., assignor to Ford Motor Company, Dearborn, Mich., a corporation of Delaware
Filed June 4, 1964, Ser. No. 372,451
1 Claim. (Cl. 267—8)

The present invention relates to vehicle suspension systems, and more particularly to that class of suspension devices used to supplement a vehicle's main suspension springs.

On certain occasions, an automotive user may wish to place a greater than normal load upon the vehicle whereby causing the soft suspension springs to be abnormally deflected and the suspension to "bottom out" when the wheels strike a bump in the road. In addition, springs sometimes age and lose some of their resiliency. The resulting spring sag can also cause bottoming when the vehicle's wheels strike an object in the road.

In order to control or limit extreme jounce deflection of a vehicle suspension resulting from overloading or loss of spring resiliency, the present invention provides a combination shock absorber and supplemental spring unit that resiliently supports a small portion of the vehicle's sprung mass when the suspension is at its designed level. The support provided by this unit increases as the suspension deflection increases in the direction of jounce.

In the presently preferred embodiment, this invention may comprise a telescopic shock absorber of the direct acting type having a surrounding coil spring with its lower end secured to the outer tube of the shock absorber. The upper end of the coil spring is guided by a rubber retainer which is in sliding contact with the shock absorber's piston rod. The rubber retainer is spaced from an abutting element at the end of the piston rod when the suspension is in a rebound position. Thus, the supplemental coil spring carries a load only when the vehicle is at or lower than design height. The rubber spring seat also functions as a resilient stop member.

The many objects and advantages of this invention will be fully comprehended from the following discussion and the accompanying drawings in which:

FIGURE 2 is an elevational view partly in section of the shock absorber and supplemental spring unit disclosed in FIGURE 1 with the various components shown in an extended or rebound position;

FIGURE 3 is an elevational view partly in section of the unit disclosed in FIGURE 2 with the shock absorber components disclosed at their design or means position;

FIGURE 4 is an elevational view in section of the upper portion of the unit with its components shown in extreme jounce position;

FIGURE 7 is a perspective view of the lower spring retainer.

Figure 1:
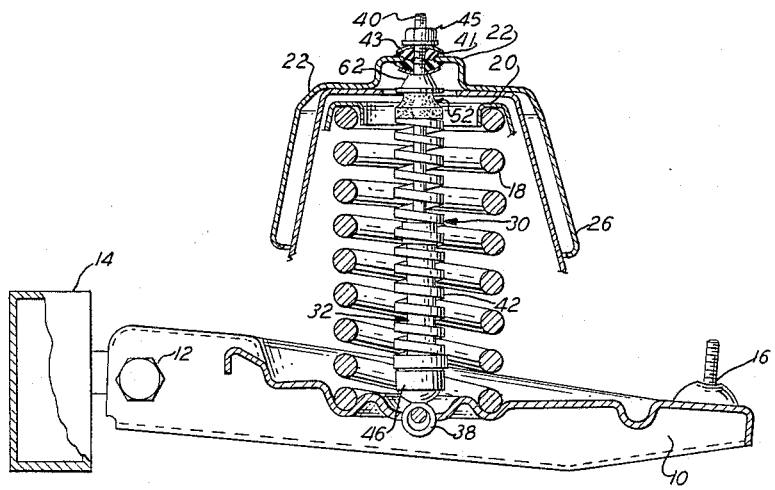
FIGURE 1 is a side elevational view of a vehicle suspension incorporating a shock absorber and supplemental spring unit constructed according to the presently preferred embodiment of this invention.

Referring now to the drawings, FIGURE 1 discloses a portion of a vehicle wheel suspension having a lower suspension arm 10 that is pivotally connected at 12 to a frame member 14. The outer end of the suspension arm 10 is provided with a ball joint assembly 16 for connection with a wheel supporting spindle or steering knuckle (not shown).

A coil suspension spring 18 has its lower end seated on the suspension arm 10. An upper seat 20 is secured to a portion 22 of the chassis frame structure and retains the upper end of the suspension spring 18. The remainder of the suspension system, including the upper suspension arm and the wheel spindle, are of conventional construction and are, therefore, not shown.

A shock absorber and coil spring unit 30 has its lower end secured to the suspension arm 10 and its upper end secured to the frame structure 22. This unit hydraulically damps movement of the suspension arm 10 and provides additional spring support for the suspension.

The unit 30 comprises a telescopic hydraulic shock absorber 32 having a body portion 34 and a piston rod portion 36. The internal construction of the shock absorber 32 is conventional and may be of the type disclosed in United States Patent 2,138,513. Naturally, the valve springs and orifice sizes are selected to provide the damping control appropriate to the particular application.

The lower end of the shock absorber 32 has a ring 38 welded to the extremity of the body member 34. The ring 38 permits the unit to be secured to the suspension arm 10 by a bushing or a bar pin.

The upper end of the piston rod 36 is threaded at 40. This construction permits that end of the shock absorber to be secured to the frame portion 22 by a pair of bushings 41, a pair of washers 43 and a nut 45.

A coil spring 42 coaxially surrounds the shock absorber 32 and means are provided for securing its lower end to the body portion 34. A bead 44 is formed about the lower end of the body portion 34. The lower end of the spring 42 is positioned by a matched pair of semicylindrical members 46 which have a smooth interior wall and a groove 48 that complements the configuration of the exterior of the shock absorber including the bead 44. The semicylindrical elements 46 are positioned about the body portion 34 with the bead 44 seated in the groove 48. The spring 42 is slipped over the shock absorber 42 with its lower coils surrounding the retaining members 46.

A shoulder 50 is provided by retaining element 46 against which the last coil of the spring 42 is seated. The internal diameter of the coil spring 42 corresponds to the outside diameter of the retaining members 46 and with this arrangement, the members 46 cannot become disengaged from the bead 44. Thus, there is a cooperation between the retaining members 46 and the spring 42, whereby the spring 42 positions the members 46 radially and the members 46, in turn, position the spring axially with respect to the bead 44.

Figure 6:
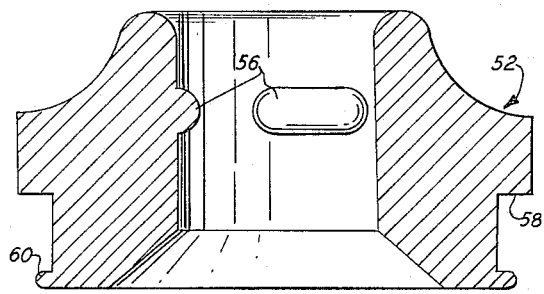
FIGURE 6 is a sectional view taken along section line 6—6 of FIGURE 5 of the rubber spring retainer.
Figure 5:
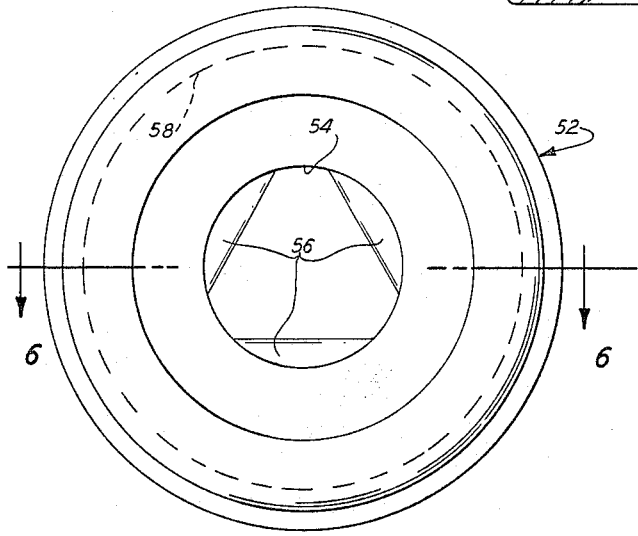
FIGURE 5 is a bottom plan view of the rubber spring retainer.

The upper end of the coil spring 42 is located by a rubber spring retainer 52, the construction of which is best seen in FIGURES 5 and 6. The upper spring retainer 52 has a central opening 54 which permits it to be slipped over the piston rod 36. The diameter of the opening 54 is in excess of the outside diameter of the piston rod 36. Three spaced apart straight ridges 56 extend inwardly from the opening 54 to slidably engage the piston rod 36. The retainer 52 is easily slidable on the piston rod 36 because the ridges 56 provide a minimum contact area.

The retainer 52 has an extending shoulder 58 that is spaced from a lip 60. The groove or channel formed between the shoulder 58 and the lip 60 serves to retain the upper coil of the coil spring 42. Thus, the retainer 52 functions to keep the coil spring concentric with respect to the piston rod 36.

An annular washer 62 is positioned about the upper end of the piston rod 36. The washer 62 is seated against a ridge 63 formed on the rod 36 and is spaced from the spring retainer 52 when the shock absorber is in the extended rebound position (FIGURE 2). The washer 62 functions as a striker or abutment member for the upper spring retainer 52. To properly perform this function, it has a generally cup shape to complement the convex shape of the upper end of the retainer 52.

When the vehicle is at its design height, the shock absorber and coil spring unit 30 will assume a position as illustrated in FIGURE 3. The upper spring retainer 52 is in contact with the washer 62. This serves to exert a light compressive loading on the frame 22. Thus, at the design height of the suspension shown in FIGURE 1, the coil spring 42 would support a small portion of the sprung weight of the vehicle. The remainder would be supported by the main spring 18.

When the vehicle wheel and suspension arm 10 move upwardly in jounce, or the body is loaded and moves downwardly with respect to the arm 10, a condition will occur corresponding to that illustrated in FIGURE 4 which depicts full jounce deflection. The rubber retainer 52 is in contact with the upper end of the shock absorber body 34 and the coil spring 42 becomes highly loaded. The spring retainer 52 is compressed between the end of the shock absorber body 34 and the washer 62 and, thus provides an additional resilient force resisting extreme jounce deflection. The compressive force exerted by the resilient spring retainer 52 builds up very rapidly as it strikes the top of the shock absorber body 34 until it stops further movement.

When the shock absorber and coil spring unit 30 is in its rebound position, the components assume the orientation illustrated in FIGURE 2. Under these conditions, the spring 42 is not loaded and does not exert a force that would tend to increase jounce deflection. When a unit 30 of the type described above is installed in a vehicle to accommodate extra load, the vehicle will not have an abnormal riding height under unladened conditions.

The unit 30 provides a three-stage control or support. This can be appreciated upon consideration of its operation during a typical stroke beginning with the full rebound position (FIGURE 2) through the full jounce position (FIGURE 4). In the initial rebound position the spring 42 is unloaded. In the normal design position illustrated in FIGURE 3, the coil spring 42 carries a nominal load. This loading increases as the unit 30 is increasingly deflected in the jounce direction. The third stage comes into effect when the shock absorber body 34 strikes the rubber spring retainer 52 which resiliently arrests further movement.

Modifications and alterations of this invention may occur to those skilled in the art that will come within the scope and spirit of the following claim.

I claim:

A vehicle suspension system having sprung and unsprung parts, a suspension spring interposed between said parts and constructed for resiliently supporting said sprung parts on said unsprung parts, a direct acting telescopic shock absorber interposed between said parts, said shock absorber having a body portion connected to one of said parts, said shock absorber also having a piston rod portion slidable with respect to said body portion and connected to the other of said parts, a spring seat secured to said body portion, a coil spring disposed concentrically about said body portion and having one end seated on said spring seat, a rubber retaining member connected to the other end of said coil spring, said rubber retaining member having a wall defining a central opening of greater internal diameter than the outside diameter of said piston rod portion, said piston rod portion being disposed within said opening, protruding portions extending radially inwardly from said wall and engaging said piston rod portion, a stop member disposed near the end of said piston rod portion, said stop member having a generally concave surface spaced apart from said rubber retaining member when said shock absorber is in an extended rebound position, said rubber retaining member having an end with a convex surface constructed to engage said concave surface when said shock absorber is in a position between full jounce and full rebound, said convex surface and said concave surface being of dissimilar curvature whereby when said rubber retaining member is moved into engagement with said stop member said rubber retaining member is distorted in a gradual progressive fashion, said rubber retaining member being compressed between the concave surface of said stop member and the end of said body portion when said shock absorber is in a full jounce position.

References Cited by the Examiner

UNITED STATES PATENTS

| | | | |
|---|---|---|---|
| 3,160,406 | 12/1964 | Dickenson | 267—8 |
| 3,163,411 | 12/1964 | Heckethorn | 267—8 |
| 3,206,184 | 9/1965 | Walker | 267—8 |

ARTHUR L. LA POINT, *Primary Examiner.*

R. M. WOHLFARTH, *Assistant Examiner.*